Dec. 9, 1941.    R. M. MILLER    2,265,668
ELECTRIC MOTOR
Filed April 7, 1939    2 Sheets-Sheet 1

INVENTOR
Robert M. Miller
BY
Synnestvedt & Lechner
ATTORNEYS

Dec. 9, 1941.   R. M. MILLER   2,265,668
ELECTRIC MOTOR
Filed April 7, 1939   2 Sheets-Sheet 2

INVENTOR
Robert M. Miller
BY
Synnestvedt + Lechner
ATTORNEYS

Patented Dec. 9, 1941

2,265,668

UNITED STATES PATENT OFFICE 2,265,668

ELECTRIC MOTOR

Robert M. Miller, Philadelphia, Pa., assignor to Fox Products Company, Philadelphia, Pa., a corporation of Pennsylvania Application April 7, 1939, Serial No. 266,456

19 Claims. (Cl. 172—126)

This invention relates to electric motors, and especially to that type of motor in which a pulsating electric current is employed to set up a reciprocatory or a vibratory motion which is then translated or converted into a rotary motion. The invention, moreover, is of especial utility in a low speed motor.

One of the primary objects of the invention is the provision of a motor of this general class which is efficient in operation, simple in construction, and of long life from the standpoint of wear.

To the above ends the invention provides an impulse type motor in which no commutators, switches or electric make and break devices need be employed, the motor being capable of operation on the common 110 volt, 60 cycle alternating current lighting lines, or on any other pulsating current such as an interrupted direct current.

The invention further has in view provision of a motor incorporating the foregoing features which motor is also capable of adjustment as to speed of rotation in a simple manner, mechanical means being employed for this purpose.

Another object of the invention is the provision of a reversing mechanism for a motor of this general class, which reversing mechanism does not require the use of special circuits or switches. Preferably, the means employed for reversal is basically of a mechanical nature, although the mechanical reversing device may be remotely controlled as by means of a solenoid or the like.

Still further, the invention has in view a motor of the general class referred to in which rotation is substantially continuous and smooth, notwithstanding the fact that it is driven by a series of impulses.

How the foregoing objects and advantages are attained, together with others which will occur to those skilled in the art, will be apparent from the following description referring to the accompanying drawings, in which—

Figure 1:
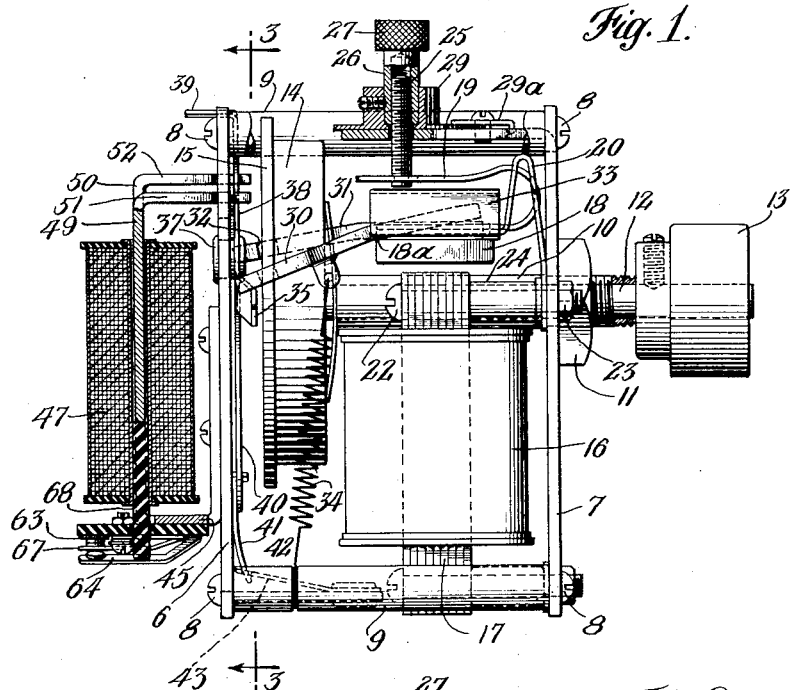
Figure 1 is a side elevational view of a motor constructed in accordance with this invention, certain parts being broken away and shown in vertical section.

As seen in Figure 1, the motor is built up in a frame incorporating a pair of spaced frame plates 6 and 7, the plates being interconnected by the bolts 8 threaded into the spacing posts 9.

The frame carries a bearing 10 which is fastened to the plate 7 as by nut 11, the bearing serving to support the motor shaft 12 adapted to cooperate with any suitable power take-off gear or other device, such as that indicated at 13, located exteriorly of the frame. Toward its other end the bearing 10 and shaft 12 terminate intermediate the frame plates, and the shaft carries a wheel 14 having a peripheral flange 15, which flange is engaged by the driving elements hereinafter described.

The frame also carries an electro-magnet incorporating two windings 16—16 and a U-shaped core 17, the poles of which project above the top of the windings as clearly seen in Figure 1. It will also be noted that these poles lie one at each side of the bearing 10 and shaft 12. An armature 18 is positioned just above the poles of the core 17, this armature being mounted and suspended by means of three springs, one of which appears at 19 and the others at 20—20. All of the springs have terminal portions lying flat against the upper face of the armature and secured thereto by means of bolts 21. The effective portion of each of the springs 20 is generally of inverted U-shape, the free leg being fastened to the frame by a bolt 22 and cooperating nut 23, which elements serve also to rigidly position the upper end of the adjacent leg of the core 17, an appropriate spacing sleeve 24 being positioned between the core part and the frame plate 7. For reasons which will be brought out more fully hereinafter, the springs 20 are arranged to urge the armature downwardly toward the poles of the core.

Spring 19 is bent upon itself to provide a leg overlying the armature 18, which leg is connected with a threaded member 25 provided for adjustment of spring 19. As mentioned herebelow, this spring urges the armature away from the poles of the core 17. An internally threaded sleeve 26 provided with a knurled head 27 cooperates with the threaded element 25 and serves to raise and lower the connected end of spring 19. Set screw 28 may be employed to fix the sleeve to the flanged supporting collar 29 which is, therefore, caused to move with the thumb screw 27. The speed control may be fixed in any desired position of adjustment by means of the clip 29a bearing against the flange of the supporting collar.

Figure 2:
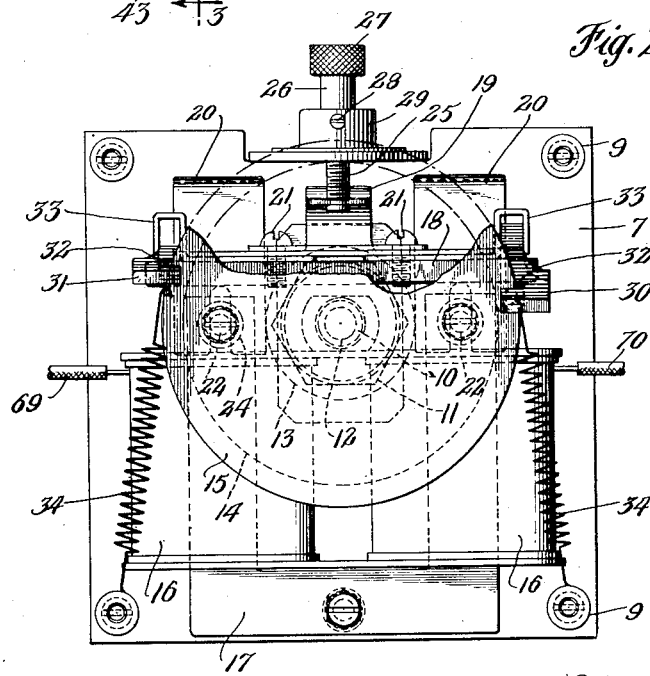
Figure 2 is an elevational view of parts of the motor shown in Figure 1, taken from the left of Figure 1 but with the left frame plate and associated parts removed, certain parts in Figure 2 also being broken away.

Vibratory movement of the armature 18 is transmitted to the wheel 14 alternatively through one or the other of a pair of lever or clutch members 30 and 31, one of these members being provided for rotation of the wheel in one direction and the other for rotation in the other direction. As will be seen particularly from Figures 1 and 2, these members 30 and 31 are arranged generally toward diametrically opposite sides of the wheel 14, each being provided with a slot 32 adapted to engage but of greater width than the thickness of the peripheral flange 15 of the wheel. The position of the two members 30 and 31 at opposite sides is inverted, as clearly appears in Figure 2. The elements 30 and 31 are inclined somewhat upwardly from the point of engagement with the flange 15 toward the armature 18 and each rests on the near edge 18a of the armature, one toward one end thereof and the other toward the other end. A rear extension of each of the members 30 and 31 overlies the armature and projects into a guiding housing 33, being loosely fitted therein to permit freedom for movement to accurately accommodate the position of the member with respect to the wheel 14 and the driving flange 15 carried thereby. More specifically, the mounting of the driving members 30 and 31 provides freedom for movement thereof in a direction generally paralleling the axis of rotation of the wheel 14 and also in a torsional sense. Because of the contact of each driving member with the edge 18a only of the armature 18, the member is free to oscillate about a pivot the axis of which is coincident with the supporting edge of the armature.

A spring 34 is associated with each of the members 30 and 31 and serves to urge the members to a lower position of oscillation about the supporting edge of the armature.

In considering the actual operation of the drive from the armature to the wheel 14, it should be kept in mind that only one of the members 30 or 31 is employed at any one time, the two members being provided for rotation in opposite directions as above noted. For purposes of illustration, therefore, consider member 30 located at the near side of the wheel when viewed as in Figure 1. Assume first an upward vibratory movement of the armature 18. This upward movement will cause the member 30 to rise substantially with the armature 18 in the angular position shown in Figure 1. In this position the slot 32, which engages the flange 15, is cocked at such angle that the upper edge of the metal at one side of the slot engages one face of the flange 15, and the lower edge of the metal at the other side of the slot engages the other face of the flange 15. The rise of armature 18 tends to tighten the frictional engagement of the slot with the flange 15 and, in consequence, the wheel 14 is caused to move upwardly at the near side when viewed as in Figure 1. Upon downward movement of the armature 18 the spring 34 tends to cause the member 30 to follow the armature, and since this downward movement has a tendency to cock the member 30 about its axis of oscillation on the supporting edge of the armature in a direction to reduce the pressure of frictional engagement of slot 32 with flange 15, the member 30 merely slides downwardly with respect to the flange 15, without imparting any driving force. Upon the next upward vibratory movement of the armature 18 the gripping action of slot 32 on flange 15 recurs, and the wheel 14 is thus caused to advance under the influence of step by step impulses.

In respect to the driving clutch member above referred to it is to be noted that while the motion thereof partakes somewhat of a pivotal motion and also of a sliding motion on the edge of the armature, for convenience this motion has been referred to as "oscillative" motion. The total motion in this sense, however, is very minute, it being necessary only that the motion be sufficient to alternatively release and renew the frictional engagement of the flange of the driving wheel.

Note further that while I prefer to form the clutch or driving member as a simple substantially flat piece having a slot in an edge thereof, the driving member may take other forms, and may even be built up of several parts, it being essential only that the driving member be provided with opposed surfaces adapted to engage cooperating opposed surfaces on the driving wheel.

Operation in the reverse direction is effected in the same manner, although at this time the drive is transmitted through member 31. During operation in either direction, it is necessary to displace the clutch or driving member which is not active out of its normal operative position, since otherwise it would tend to resist rotation of the wheel 14 in the desired direction. To accomplish this and also to accomplish reversal of the direction of rotation when desired, I have provided means for raising one or the other of members 30 or 31 upwardly to such an extent that its slot 32 cannot frictionally bind on the flange 15. Thus from inspection of Figure 1, in which position the member 30 is being used for active driving, the member 31 is displaced upwardly substantially as clearly appears, in which position the slot 32 has ample clearance to freely pass the flange 15.

Figure 3:
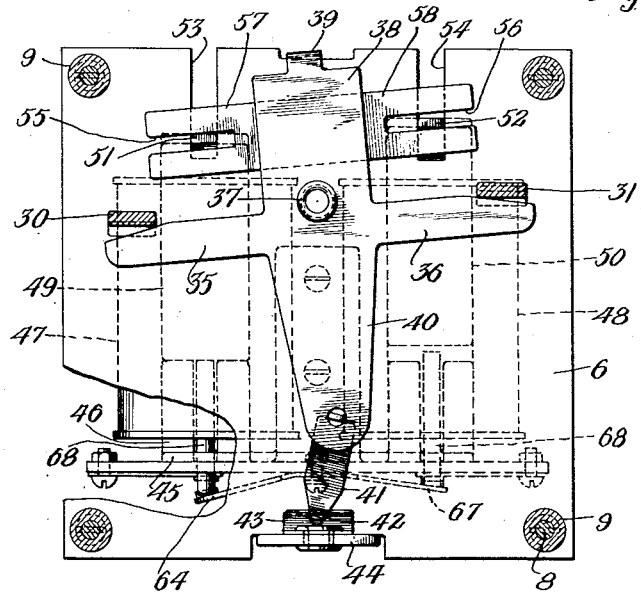
Figure 3 is a rear face view of one of the frame plates and parts mounted thereon, taken as indicated by the section line 3—3 on Figure 1.

The mechanism provided for this purpose appears most clearly in Figure 3, which is an inner face view of the frame plate 6 and parts mounted thereon. Here it will be seen that a rocker member having arms 35 and 36 is pivoted to the frame plate 6 as at 37. Arm 35 projects under the driving member 30 and arm 36 under member 31, so that upon rocking of the reversing mechanism one or the other of the driving clutch elements 30 or 31 is raised substantially in order to provide the relative vertical relation between the two members clearly appearing in Figure 1.

An upward extension or arm 38 of the rocker mechanism is provided with a manually operable control tab 39 by means of which the rocker assembly may be tilted to either of its two positions.

Figure 4:
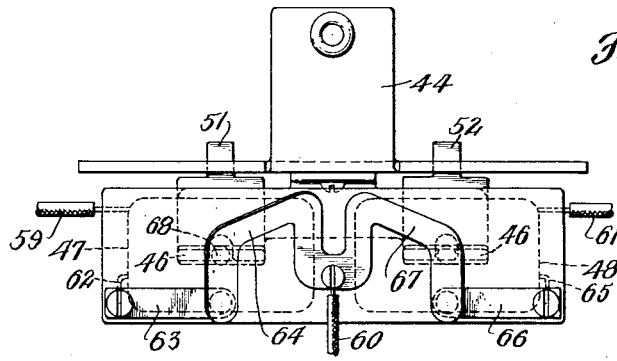
Figure 4 is a bottom view of the parts shown in Figure 3.

In order to ensure that the reversing mechanism will remain in either of its positions, as against vibration or the like, I prefer to use a toggle device providing a snap action, this device being connected with a downwardly projecting arm 40 of the rocker mechanism, to which is freely pivoted a toggle member 41 having its lower extremity seated in an aperture 42 formed in a spring 43 (see also Figure 1). The spring is, of course, mounted on the frame of the motor in any convenient manner, as by means of the bracket 44 (see also Figure 4).

For certain purposes I prefer also to provide means of remote control of the reversing mechanism. Such mechanism may conveniently be mounted on an angle support 45 secured to the outer face of the frame plate 6. As seen in Figure 3, this support has upstanding projections 46 which serve to carry the solenoid windings 47 and 48. The solenoids are provided with armatures 49 and 50 which project above the windings and which carry inwardly bent actuating arms 51 and 52 extended through slots 53 and 54 formed in the frame plate 6. The actuating arms or fingers 51 and 52 are received in slots 55 and 56 formed in the arms 57 and 58 which project laterally from the upward extension 38 of the rocking reverse mechanism.

By the foregoing mechanism it will be seen that actuation of one solenoid or the other (47 or 48) will cause the rocker mechanism to move from one position to the other. A three wire current supply and control system may be associated with the solenoids, the three connections appearing at 59, 60 and 61 in Figure 4. As clearly appears, the connection 59 extends directly to the winding 47, the connection 61 being extended directly to the winding 48. The other terminal of the winding 47 is connected by means of a wire 62 with a contact member 63 which is adapted to complete the circuit for this winding to connection 60 through a cooperating spring contact element 64. Similarly, the circuit for solenoid 48 is completed to the center wire 60 of the three wire system by means of connection 65, contact member 66 and cooperating spring contact element 67. The make and break of the circuit between the contact elements 63 and 64, on the one hand, and elements 66 and 67 on the other, is controlled by movement of the armatures 49 and 50 for the respective solenoids 47 and 48. Thus, as best seen in Figures 1 and 3, the solenoid 47 is provided with an actuating member 68 preferably made of non-magnetic material, which member projects into the core space of the winding to abut against the lower end of armature 49. The lower extension of this member 68 is adapted to abut against the spring contact 64 so that upon downward movement of armature 49 the actuating member or rod 68 breaks the connection between the contact members 63 and 64. Similar parts are provided for the solenoid winding 48, in view of which the operation of the reverse control is as follows:

Assuming a position of the rocking reverse mechanism as shown in Figure 3, in which the armature 50 of solenoid 48 is in its upper position and the armature 49 of solenoid 47 is in its lower position, energizing the circuit incorporating connections 60 and 61 will result in downward movement of armature 50 which, in turn, through engagement of the actuating finger 52 with the member 58, will cause the reverse rocker mechanism to turn in a clockwise direction when viewed as in Figure 3. This downward movement of armature 50 also causes the member 68 to move downwardly and break the circuit of winding 48 by separating the contact members 66 and 67. The snap action or toggle device incorporating elements 40 to 43 will serve to retain the reverse mechanism in its new position until the solenoid 47 is energized by completing a circuit incorporating the connections 59 and 60.

Thus the invention provides not only for manual reverse of the motor by movement of the reversing finger 39, but also for remote solenoid control, either being operable at will. With regard to this reversing, it is to be noted that the toggle mechanism cooperates both with the manual and also with the remote control in a way to ensure maintaining the desired adjustment.

In the form of motor device shown in Figures 1 to 4 inclusive, it is intended that the motor should be operated on the common 110 volt, 60 cycle A. C. lighting line, for this purpose it being necessary merely to connect the windings of electro-magnets 16—16 with the lighting circuit, as by means of terminals 69 and 70 (see Figure 2).

Figure 5:
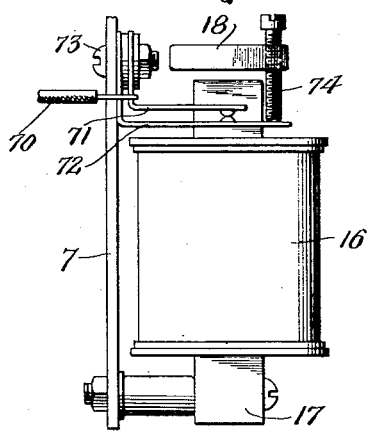
Figure 5 is a view of a portion of the motor device incorporating a modification.

On the other hand, if it is desired to operate the motor on a source of direct current, this may be done by employing a circuit breaker of the type shown in Figure 5. Here only a portion of the elements of the motor are illustrated, one of the magnets 16 being shown as mounted on the frame plate 7. The connection 70 in this form, instead of being extended directly to the winding of the magnet 16, is coupled with a spring contact member 71 cooperating with another spring contact 72, the two contacts being supported by a post as at 73, with the contact 72 electrically connected with the frame plate 7. The circuit for the windings of magnet 16 may, of course, be completed by connection of one terminal of the windings directly with the motor frame.

Actuation of contact member 72 in order to make and break the circuit is effected by an adjustable screw 74 mounted on the armature 18, so that the circuit is broken with each downward movement of the armature and re-made upon each upward movement thereof.

It will be understood that in the arrangement of Figure 5 it is intended that other elements of the motor device shall be arranged substantially in accordance with the showing of Figures 1 to 4 inclusive, and that the speed adjustment and reversing control are equally applicable to motors designed for operation on either alternating or direct current. Where feasible, however, an alternating source of current is preferably used, for the reason that this avoids the necessity of employing a circuit breaker. Furthermore, with the alternating current type of motor in accordance with the present invention, provision has been made not only for operation of the motor without the use of any switches, commutators or the like but, in addition, the invention provides for variation of the speed and also for reversal without the use of switches or the like. Thus the invention affords an unusual degree of reliability and simplicity.

While the action of the driving members 30 and 31, especially with respect to their gripping of the driving flange 15, has already been described above, there are certain other important features of operation to be noted, as follows:—

The spring suspension for the armature 18 is an important feature for a number of reasons. One of the problems encountered with motor units of this general class heretofore proposed was the problem of vibration usually set up as a result of the vibratory armature striking a limiting stop at one end of its stroke or the other, or both. For purposes of efficiency it is necessary, of course, to locate the armature very close to the poles of the electro-magnets, for the reason that the magnetic field is most intense immediately adjacent to the poles of the electro-magnet core. With a close mounting it is difficult to provide a suspension for the armature of such character as to avoid striking of the armature on the core poles. Such striking, of course, sets up a violent vibration. The particular spring mounting of the armature described above provides against striking of the armature on the core and, at the same time, permits mounting of the armature very close to the core. The spring mounting further does not necessitate employment of a limiting stop for the upward movement of the armature. Thus the armature is full or free floating, being connected with the frame of the motor solely through the supporting springs, thereby reducing vibration to a minimum. The manner in which the spring suspension functions is as follows:

As above indicated, springs 20 urge the armature downwardly toward the core, while spring 19 acts in the opposite sense. To consider the advantage of this, note first that the total throw or movement of the armature must necessarily be very small (especially when the magnets are energized from a source of 60 cycle current) because of the rapidity of the vibration. Rapid vibration, in its turn, is of advantage in providing maximum smoothness in rotation of the wheel 14.

In view of the above factors it is desirable to have a large increase in the restoring force of the springs as the armature moves from its most remote to its nearest position with respect to the magnet core. Since the restoring force of a spring increases with deflection, the effect of the double spring mounting above referred to is a very large increase in the restoring force as the armature approaches the core, the reason being that the force exerted by spring 20 decreases as the armature approaches the core, while the restoring force of spring 19 increases with this same movement.

In accordance with the invention, this effect of high increase of restoring force within the limited throw of the armature is further enhanced by so constructing the springs 19 and 20 that in the position of the armature remote from the core, both springs are in a position of substantial deflection from their zero values. The reason why this further enhances the effect referred to is that the restoring force of a spring of the type here employed has a larger increase per unit deflection in a range of deflections substantially removed from the zero value.

As the armature moves from a position adjacent the core to its more remote limit of movement, the springs also act in the opposite sense, i. e., provide a high increase of the force tending to return the armature to a position represented by a condition of equilibrium between the opposing forces of the two springs.

A still further advantage of this double spring suspension lies in the fact that the action of each spring tends to damp out the tendency of the other spring to cause the armature to vibrate at its (the other spring's) natural frequency of vibration.

Because of all of the foregoing factors, the invention provides a spring suspension for a vibratory armature in which no limiting stops for either direction of vibration need be employed, and in which the armature may be mounted very close to the core without danger of the armature striking the core and thus setting up objectionable vibration.

An important advantage of the invention also lies in the fact that the up stroke (under the influence of spring 19) is utilized as the driving stroke of the clutch member in rotating the wheel. Were the down stroke to be employed for the driving stroke, the drive would not be as effective and the power loss would be substantial for the reason that at the commencement of the down stroke, the magnetic force is at its minimum, the armature then being in its most remote position from the magnetic core. On the other hand, the restoring force of the spring 19 is at its maximum at the commencement of its stroke, and because of this, utilization of the up stroke for driving, results in material improvement in efficiency and starting torque.

The speed control, incorporating the threaded collar 29 and thumb screw 27, provides for adjustment of the force of spring 19 which, in turn, causes the armature to vibrate at a greater or a lesser distance from the core. Because of the difference in intensity of the magnetic field close to and more remote from the armature, this adjustment varies the amplitude of the vibration. The frequency of vibration, of course, remains constant, this being determined by the frequency of the current employed.

Still another feature to be kept in mind is the construction of wheel 14 which, as shown in the drawings, is of substantial mass. The mass of the wheel will, of course, depend upon other characteristics of any particular unit but, in general, this mass should be sufficient to ensure continuance of rotation of the wheel between the impulses transmitted thereto through the clutch members 30 or 31.

The motor unit of the invention is also of substantial advantage because of the employment of only a single bearing for the motor shaft. Since the speed of the motor is relatively low, the wear on the bearing is negligible.

The arrangement of the driving members 30 and 31, in addition to the features referred to more fully above, is also of advantage for the reason that the position of the wheel 14 and flange 15 need not be accurately arranged, either axially of the wheel or as to its angular relation to other parts. The reason for this lies in the fact that the driving elements 30 and 31 are self-adjusting in character, i.e., may move in a direction generally axially of the wheel and may also move in a torsional sense, being positioned in large part merely by virtue of engagement of the slots 32 with the flange 15. The guiding pockets 33 in which the inner ends of the members 30 and 31 are received fit only loosely and, therefore, do not impair this self-adjusting action.

In operation, it will be found that with proper mass in the wheel 14 for any particular size of motor unit the rotation of the motor shaft is, for practical purposes, a smooth continuous rotation. Another factor which also contributes to the smoothness is the fact that a frictional engagement is employed between the actuating members and the drive flange 15 on the wheel. This frictional engagement can "pick up" and release at any point around the flange, this also being of importance in permitting adjustment of the speed of the motor.

In connection with the appended claims, it is to be kept in mind that where the claims refer to operation of the motor on a pulsating electric current, I contemplate any current having such fluctuations or interruptions as to set up the desired variation in magnetic field required for the vibratory motion of the armature. Thus alternating current may be employed, pulsating current or interrupted direct current, etc.

I claim:

1. In a motor device adapted to operate on a pulsating electric current, a rotative element, an electro-magnet and a cooperating vibratory armature, a pair of driving members receiving vibratory motion from said armature and adapted alternatively to cooperate with the rotative element to drive the same in either direction under the influence of step by step driving impulses, a reversing mechanism adapted alternatively to displace one or the other of said driving members out of its normal operative position, and a solenoid control for actuating said reversing mechanism including means for breaking the solenoid circuit upon operation thereof to reverse the motor.

2. In a motor device adapted to operate on a pulsating electric current, a rotative element, an electro-magnet and a cooperating vibratory armature, a pair of driving members receiving vibratory motion from said armature and adapted alternatively to cooperate with the rotative element to drive the same in either direction under the influence of step by step driving impulses, a reversing mechanism adapted alternatively to displace one or the other of said driving members out of its normal operative position, a toggle or snap action device operative to retain the reverse mechanism in either position of motor operation, and a solenoid control for actuating the reverse mechanism including means for breaking the solenoid circuit upon operation of the reverse mechanism thereby to a point in which the snap action device ensures continuance of movement of the reversing mechanism to the limit of its throw.

3. A motor including a vibratory member, electro-magnetic means for vibrating said member, a rotative element, and drive means interconnecting the vibratory member and the rotative element for converting the vibratory motion of said member into rotary motion of said element, the drive means including a pair of levers each extending across and bearing against an edge of said member to receive vibratory motion therefrom, the levers being angularly oscillatable about said edge under the influence of vibratory motion of said member, and the levers each having a slot opposite edges of which are adapted to alternately frictionally engage and release opposed surfaces of the rotative element upon angular oscillation of the levers in opposite directions, the two levers being extended for cooperation with the rotative element toward diametrically opposite sides thereof, and means for alternatively displacing said levers out of their substantially normal driving position whereby to provide for rotation of the rotative element in either direction.

4. A motor including a rotative element, a vibratory member, electro-magnetic means for vibrating said member, and means for translating vibratory movement of said member into rotative movement of said element including a lever or clutch having engagement with the vibratory member to receive vibratory motion therefrom and having freedom for angular oscillation with respect to said member, the rotative element and the lever having opposed pairs of complementary cooperating friction gripping surfaces providing driving interengagement when the lever device is angularly oscillated in one direction and providing release of said engagement when the lever device is angularly oscillated in the other direction, yielding means urging the lever in a direction to effect frictional driving interengagement with the rotative element, the lever having freedom for displacement movement with respect to the vibratory member in a direction toward and away from the rotative element to provide freedom for self-adjustment of the lever as to its position of frictional gripping engagement with the rotative element, and a second similarly arranged lever or clutch adapted to cooperate with the rotative element generally diametrically opposite to the first lever, together with means for alternatively displacing one or the other of said levers out of operative position to provide for rotation of said element in either direction.

5. A motor including a vibratory driving member, supporting means for said member providing full floating resilient suspension thereof, electro-magnetic means for vibrating said member, a rotatable driven element, and motion translating means interconnecting said member and said element including a lever receiving vibratory motion from said member but oscillatable with respect thereto in a plane containing the path of vibratory movement of said member, the lever further being supported with freedom for reciprocatory movement with respect to the vibratory member in a direction toward and away from the rotatable element, the rotatable element and said lever having opposed pairs of complementary cooperating friction gripping surfaces which alternately frictionally engage and release upon oscillation of the lever in opposite directions.

6. A motor including a vibratory member, supporting means for said member providing full floating resilient suspension thereof, electromagnetic means for vibrating said member, a rotatable element, and drive means interconnecting the vibratory member and the rotatable element for converting the vibratory motion of said member into rotary motion of said element, the drive means including a lever extended from the rotatable element to the vibratory member and abutting said member to receive vibratory motion therefrom, the lever being angularly oscillatable with respect to the vibratory member while in abutting relation, and the lever and rotatable element having opposed pairs of complementary cooperating friction gripping surfaces which alternately frictionally engage and release upon angular oscillation of the lever in opposite directions, the lever having freedom for reciprocatory movement with respect to the vibratory member in a direction toward and away from the rotatable element to provide freedom for self-adjustment of the lever as to its position of frictional engagement with the rotatable element, and yielding means for urging the lever into its position providing frictional driving engagement of said opposed pairs of surfaces.

7. An impulse motor incorporating a vibratory driving member, supporting means for said member providing full floating resilient suspension thereof, electro-magnetic means for vibrating said member, a rotatable driven element, and motion translating means interconnecting said member and said element including an oscillatable lever receiving motion from the vibratory driving member, the lever and the driven element having opposed pairs of complementary cooperating friction gripping surfaces which alternately frictionally engage and release upon oscillation of the lever in opposite directions, and said lever being supported with freedom for movement with respect to the driving member in a direction toward and away from the rotatable element to provide freedom for self-adjustment of the lever as to its position of frictional gripping engagement with the rotatable element.

8. A motor in accordance with claim 5 further incorporating a second similarly arranged lever adapted to cooperate with the rotatable element generally diametrically opposite to the first lever, together with means for alternatively displacing one or the other of said levers out of operative position to provide for rotation of said element in either direction.

9. An impulse motor incorporating an electromagnetically vibrated driving member, a rotatable driven element, motion translating means interconnecting said member and said element including an oscillatable lever receiving motion from the vibratory driving member, the lever and the driven element having opposed pairs of complementary cooperating friction gripping surfaces which alternately frictionally engage and release upon oscillation of the lever in opposite directions, and said lever being supported with freedom for movement with respect to the driving member in a direction toward and away from the rotatable element to provide freedom for self-adjustment of the lever as to its position of frictional gripping engagement with the rotatable element, and guide means for the lever having a guide surface paralleling the plane of oscillatory movement of the lever.

10. An impulse motor incorporating an electromagnetically vibrated driving member, a rotatable driven element, and motion translating means interconnecting said member and said element including a lever having edge-to-surface engagement with the vibratory member to receive motion therefrom, the lever being oscillatable about the line of said edge-to-surface engagement, the lever and the driven element having opposed pairs of complementary cooperating friction gripping surfaces which alternately frictionally engage and release upon oscillation of the lever in opposite directions, and said lever being supported with freedom for movement with respect to the driving member in a direction toward and away from the rotatable element to provide freedom for self-adjustment of the lever as to its position of frictional gripping engagement with the rotatable element.

11. A motor including a vibratory member, electro-magnetic means for vibrating said member, a rotatable element, and drive means interconnecting the vibratory member and the rotatable element for converting the vibratory motion of said member into rotary motion of said element, the drive means including a lever extended from the rotatable element to the vibratory member and abutting said member to receive vibratory motion therefrom, the lever being angularly oscillatable with respect to the vibratory member while in abutting relation, and the lever and rotatable element having opposed pairs of complementary cooperating friction gripping surfaces which alternately frictionally engage and release upon angular oscillation of the lever in opposite directions, the lever having freedom for reciprocatory movement with respect to the vibratory member in a direction toward and away from the rotatable element to provide freedom for self-adjustment of the lever as to its position of frictional engagement with the rotatable element, and yielding means for urging the lever into its position providing frictional driving interengagement of said opposed pairs of surfaces.

12. An impulse motor incorporating an electro-magnetically vibrated driving member, a rotatable driven element, and motion translating means interconnecting said member and said element including an oscillatable lever receiving motion from the vibratory driving member, the lever and the driven element having opposed pairs of complementary cooperating friction gripping surfaces which alternately frictionally engage and release upon oscillation of the lever in opposite directions, and said lever being supported with freedom for movement with respect to the driving member in a direction toward and away from the rotatable element to provide freedom for self-adjustment of the lever as to its position of frictional gripping engagement with the rotatable element.

13. A motor in accordance with claim 12 and further incorporating yielding means acting on said lever and normally urging it toward its position of frictional gripping engagement with the rotatable element.

14. A motor in accordance with claim 12 and further incorporating a second similarly arranged lever cooperating with the rotatable element substantially diametrically opposite the first lever, together with means for alternatively displacing one or the other of said levers out of operative position to provide for rotation of said element in either direction.

15. A motor in accordance with claim 12 and further incorporating a second similarly arranged lever cooperating with the rotatable element substantially diametrically opposite the first lever, means for alternatively displacing one or the other of said levers out of operative position to provide for rotation of said element in either direction, and a toggle device operative to retain the reversing means in either position of motor operation.

16. An impulse motor incorporating a vibratory driving member, supporting means for said member providing full floating resilient suspension thereof, electro-magnetic means for vibrating said member, a rotatable driven element, motion translating means interconnecting said member and said element including an oscillatable lever receiving motion from the vibratory driving member, the lever and the driven element having opposed pairs of complementary cooperating friction gripping surfaces which alternately frictionally engage and release upon oscillation of the lever in opposite directions, and said lever being supported with freedom for movement with respect to the driving member in a direction toward and away from the rotatable element to provide freedom for self-adjustment of the lever as to its position of frictional gripping engagement with the rotatable element, and speed adjustment mechanism for the motor including means for controllably varying the resiliency of the supporting means for the vibratory member and thereby varying the length of the vibration stroke of said member.

17. An impulse motor incorporating a vibratory driving member, an electro-magnet for vibrating said member, supporting means for said member including spring means acting to move the member away from the electro-magnet, a rotatable driven element, and motion translating means interconnecting said member and said element including an oscillatable lever receiving motion from the vibratory driving member, the lever and the driven element having opposed pairs of complementary cooperating friction gripping surfaces which frictionally engage upon vibratory movement of the driving member in a direction away from the electro-magnet and which release upon vibratory movement of the driving member in a direction toward the electro-magnet, and said lever being supported with freedom for movement with respect to the driving member in a direction toward and away from the rotatable element to provide freedom for self-adjustment of the lever as to its position of frictional gripping engagement with the rotatable element.

18. A motor in accordance with claim 5 in which the rotatable driven element and the oscillatable lever are arranged to provide frictional engagement of the opposed pairs of cooperating gripping surfaces upon movement of the vibratory driving member in a direction away from the electro-magnetic means for vibrating said member.

19. A motor in accordance with claim 12 in which resilient means are associated with the driving member and in which one stroke of said driving member is induced magnetically and the return stroke under the action of said resilient means, the rotatable driven element and the oscillatable lever being arranged to provide frictional engagement upon each return stroke, and for release of engagement upon each magnetic stroke.

ROBERT M. MILLER.